United States Patent

[11] 3,603,728

[72] Inventor Yoshiaki Arimura
Kawasaki-shi, Japan

[21] Appl. No. 786,882
[22] Filed Dec. 26, 1968
[45] Patented Sept. 7, 1971
[73] Assignee Tokyo Shibaura Electric Co., Ltd.
Kawasaki-shi, Japan
[32] Priority Dec. 28, 1967
[33] Japan
[31] 42/83698/

[54] POSITION AND DIRECTION DETECTING SYSTEM USING PATTERNS
4 Claims, 43 Drawing Figs.

[52] U.S. Cl. .......... 178/6.8, 178/DIG. 1, 340/146.3 A
[51] Int. Cl. .......... G06k 9/12, H04n 5/30, H04n 7/18
[50] Field of Search .......... 178/5.4 M, DIG. 1, 6, 6.8, 18, 19; 235/151.11; 340/146.3

[56] References Cited
UNITED STATES PATENTS

| | | | |
|---|---|---|---|
| 3,293,417 | 12/1966 | Heissmeier | 235/151.11 |
| 3,297,879 | 1/1967 | Meyer | 340/146.3 |
| 3,337,766 | 8/1967 | Malaby | 340/146.3 |
| 3,410,956 | 11/1968 | Grossimon | 178/19 |
| 3,426,146 | 2/1969 | Seaman | 178/6 IND |

*Primary Examiner*—Bernard Konick
*Assistant Examiner*—Howard W. Britton
*Attorney*—George B. Oujevolk ABSTRACT: A fine object having patterns on its predetermined surface portions is scanned to produce an image signal containing a pattern signal component. The shape of each pattern is such that the pattern signal component consists of pulses of a predetermined width, interval and number. The image signal is converted and further passed through operation circuits to detect the direction and position of the fine object.

Yoshiaki Arimura
INVENTOR.

BY George B. Oujevolk
Attorney

Yoshiaki Arimura
INVENTOR.

BY George B. Oujevolk
Attorney

Yoshiaki Arimura
*INVENTOR.*

*BY* George B. Oujevolk
Attorney

INVENTOR.
Yoshiaki Arimura

BY George B. Oujevolk
Attorney

Yoshiaki Arimura
INVENTOR.

BY George B. Oujevolk
Attorney

Yoshiaki Uemura
INVENTOR.

BY George B. Oujevolk
Attorney

POSITION AND DIRECTION DETECTING SYSTEM USING PATTERNS

This invention relates to a system for automatically detecting the position and direction of a fine object using an optical means.

It is known that the position and direction of a fine object are detected by optically detecting the shape of the object or a pattern formed on the surface of the object. When the shape and the pattern of the object to be detected are of a wide variety, it is necessary to provide a separate manner of detection appropriate to each object to be detected. It is also known to provide a position pattern on the surface of an object, in addition to a surface pattern which is inherent to the function of the object. The provision of the position pattern in the prior art system, however, has certain drawbacks. Namely, the shape, size and position of the inherent pattern cannot be optically selected. Further, when the object is placed within an optical range, the direction of the object must be carefully fixed. Unless these drawbacks are accompanied, it has been difficult to distinguish a position-direction pattern from a pattern which is inherent to the function or construction of a fine object to be detected.

According to this invention, the position and direction of a very fine object can be detected using predetermined patterns formed on the surface of the object, without subjecting the formation of a pattern inherent to the function of the object to any limitations and regardless of the shape of the object and a pattern formed thereon. An example of the inherent pattern is an electrode formed on a pellet to form a transistor.

An object of this invention is to provide a pattern which is suitable for electrical treatment and which permits the position of a fine object to be detected without subjecting the shape and the inherent pattern of the object to limitations.

Another object of this invention is to provide patterns which are suitable for electrical treatment and which permit the position and direction of a fine object to be detected without subjecting the shape and the inherent pattern of the object to limitations.

Another object of this invention is to provide a system for detecting the position of a fine object by using an electrical signal generated when an image of the object having a pattern thereon is scanned.

A further object of this invention is to provide a system for detecting the position and direction of a fine object by using electrical signals generated when images of the object having first and second patterns thereon are scanned.

A position pattern for detecting the position of a fine object in accordance with this invention has such a shape that, when scanned, produces an image signal component consisting of pulses of a predetermined width, interval and number. The direction of the object can also be detected by using two patterns which produce image signals having different pulses in number, width and in pulse interval. An electrical signal generated by scanning the pattern is shaped into a detection signal by which the position of the pattern relative to a fixed point can be detected. The direction of the fine object can also be detected by calculating the difference between the values on a coordinate system of two patterns.

The present invention can be more fully understood from the following detailed description when taken in connection with the accompanying drawings, in which:

FIG. 1 is a circuit diagram embodying the position and direction detecting system of this invention;

FIGS. *2a* to *2o* inclusive are examples of a pattern used in the system of this invention;

Figure 1:
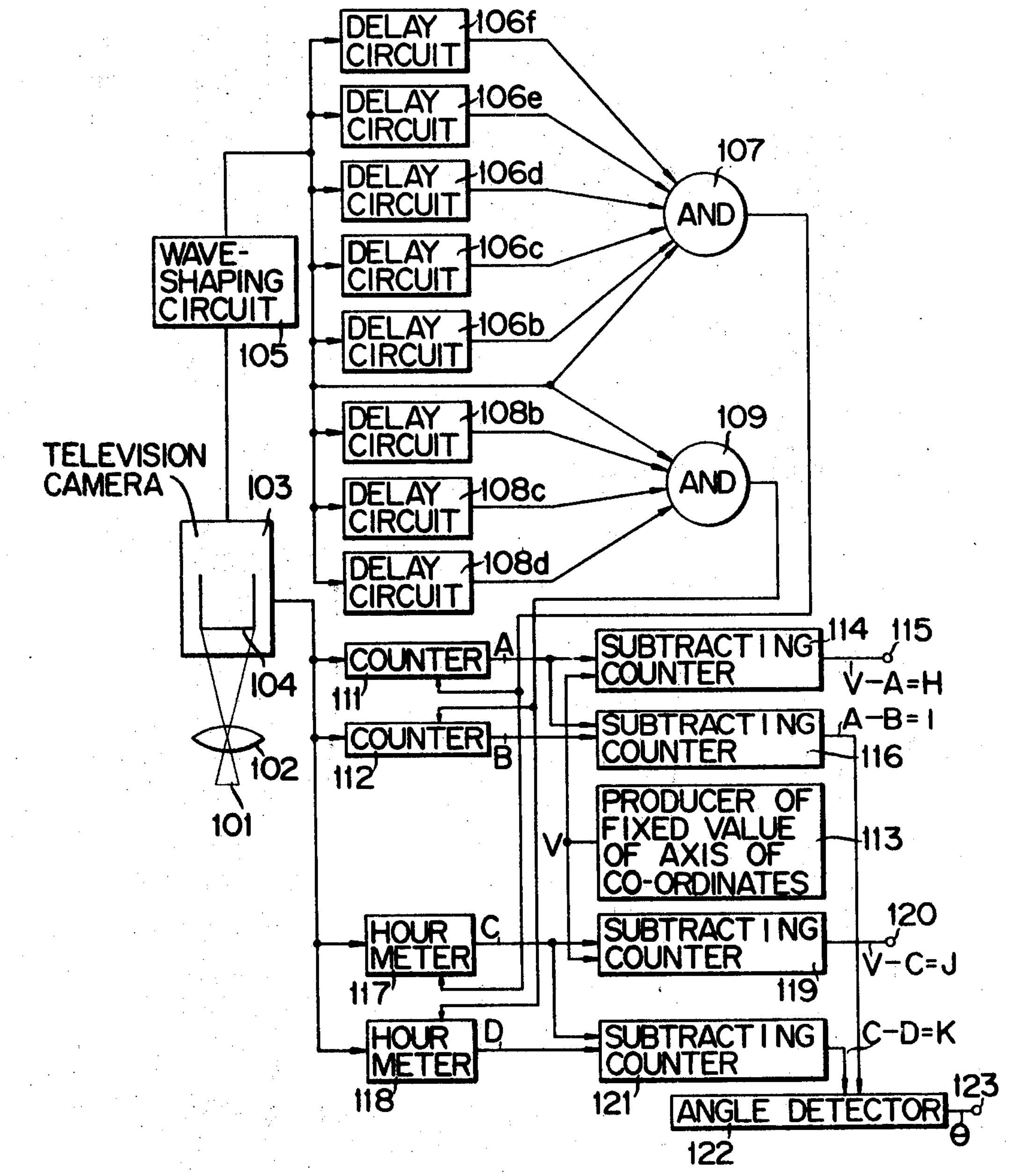
Figure 2A:
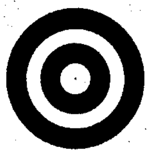
Figure 2B:
Figure 2C:
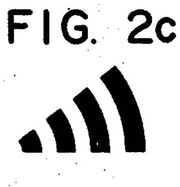
Figure 2D:
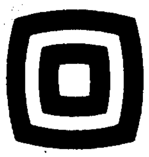
Figure 2E:
Figure 2F:
Figure 2G:
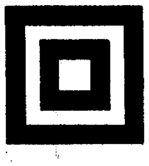
Figure 2H:
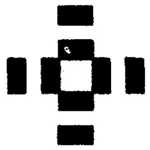
Figure 2I:
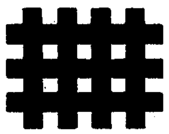
Figure 2J:
Figure 2K:
Figure 2L:
Figure 2M:
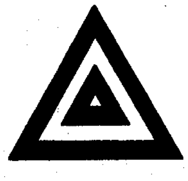
Figure 2N:
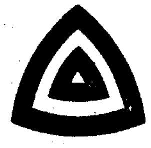
Figure 2O:
Figures 3, 9:
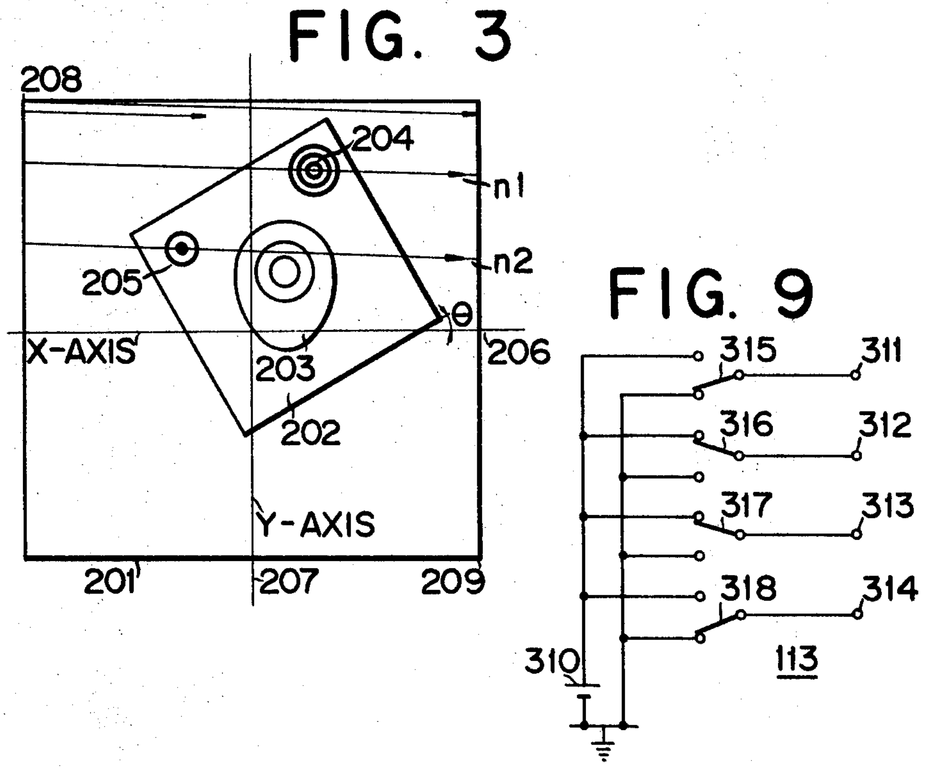
FIG. 3 shows a pellet image formed on the scanning surface of a television camera shown in FIG. 1.
Figure 4:
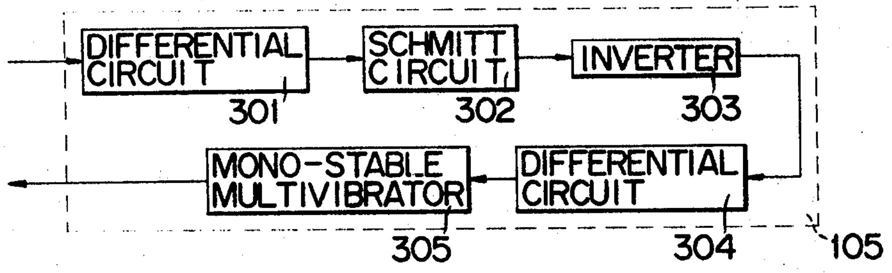
FIG. 4 is a circuit diagram of a wave-shaping circuit shown in FIG. 1.
Figure 5A:
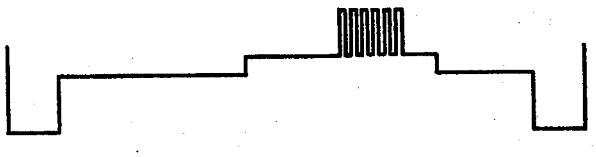
Figure 5B:
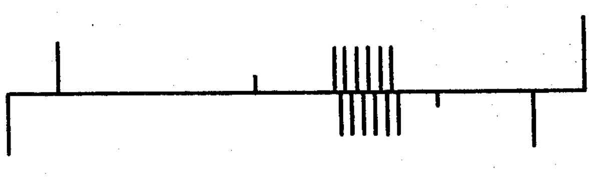
Figure 5C:
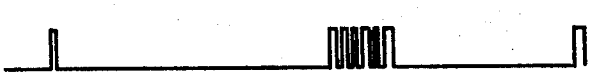
Figure 5D:
Figure 5E:
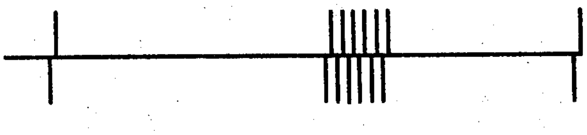
Figure 5F:
Figure 10:
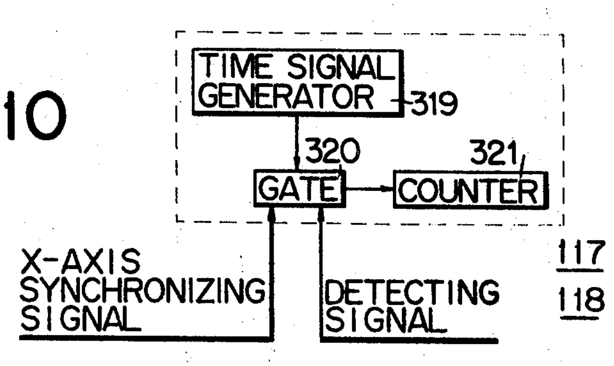

FIGS. *5a* to *5f* show waveforms corresponding to a first pattern in the wave-shaping circuit shown in FIG. 4;

FIGS. *6a* to *6f* show waveforms to explain the operation of delay circuits corresponding to the first pattern shown in FIG. 1;

FIGS. *7a* to *7f* show waveforms representing a second pattern in the wave-shaping circuit shown in FIG. 4;

FIGS. *8a* to *8d* are waveforms to explain the operation of delay circuits corresponding to the second pattern shown in FIG. 1;

FIG. 9 is a detailed view of means for producing the fixed value of establishment of a coordinate axis shown in FIG. 1;

FIG. 10 illustrates an hour meter shown in FIG. 1; and

Figure 11:
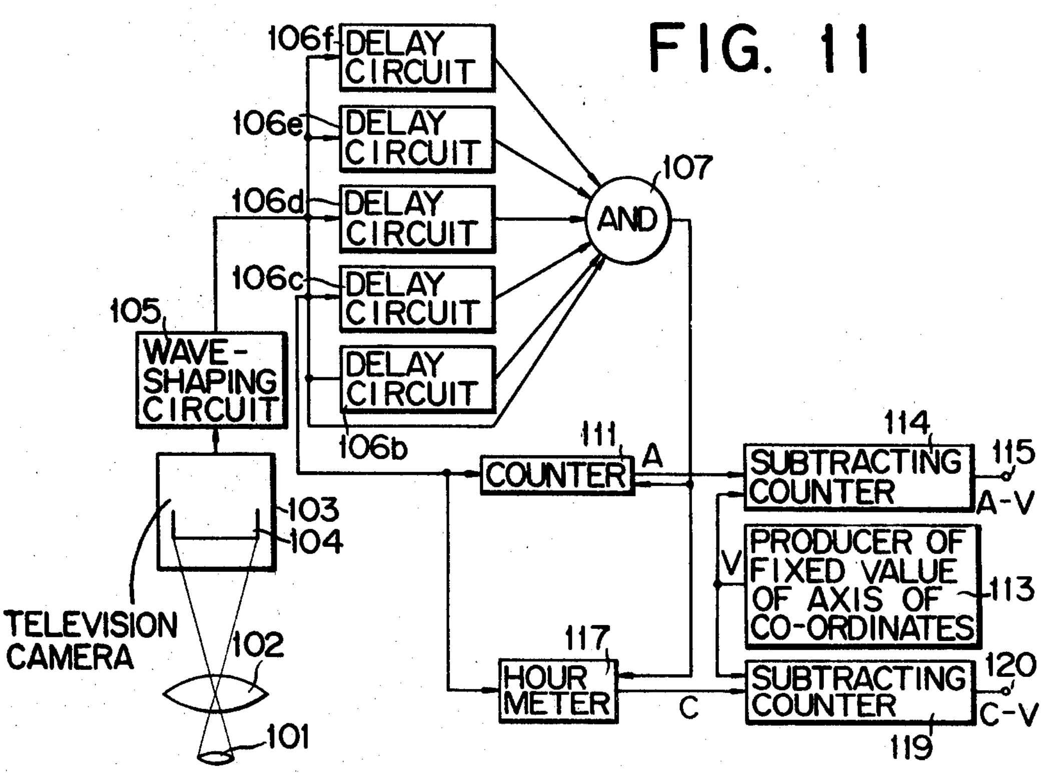

FIG. 11 is a circuit diagram illustrating a part of the arrangement of FIG. 1.

For the purpose of description, a pellet for forming a transistor will be taken as an example of a fine object and the invention will be embodied in connection with the detection of an electrode mounted on the pellet.

Figures 6A, 6B, 6C, 6D, 6E, 6F:
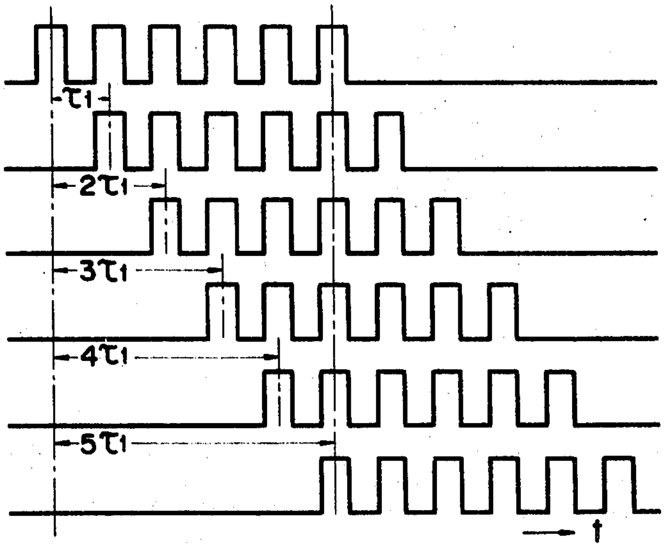

Referring to FIG. 1, the pellet indicated by 101 comprises an electrode pattern photoetched in the surface thereof to form a transistor, and first and second patterns marked on the surface thereof. The first and second patterns may be provided simultaneously with the photoetching process of the electrode pattern. The pellet 101 is exposed to vertical illumination, or to secure a sufficient contrast, to dark ground illumination or polarizing illumination, so that a real image of the pellet carrying the patterns is transferred through a lens 102 on the scanning surface 104 of an image pickup tube in a television camera 103. The first and second patterns marked on the surface of the pellet 101 respectively consist of similar, but not identical, multiple rings as shown in FIG. *2a*. The multiple rings will permit the patterns to be detected equally irrespective of the direction in which the pellet 101 lies. As shown in FIG. 3, a real image 202 of the pellet 101 including images of the electrode pattern 203, and the first and second patterns 204 and 205 is projected on the scanning surface 104 of the image pickup tube, so that the projected image is within a visual field 201 of the optical system. On the visual field 201 is established a coordinate system having an X-axis 206 and a Y-axis 207 whose coordinate origin lies on the center of the visual field 201. The first pattern 204 is arranged to generate a basic train of six pulses and the second pattern 205 to generate a basic train of four pulses, although it is apparent that the number of pulses to be generated is not limited to the numbers just described. In order that the first and second patterns 204 and 205 may be electrically discriminated with ease, in other words, pulse signals generated after scanning of the patterns may be discriminated easily, the spacing or spacings between adjacent rings forming one of the patterns is varied from those of multiple rings forming the other pattern. The scanning surface 104 of the image pickup tube scans the image of the pellet from one end 208 of the visual field 201 to the other end 209 thereof with a plurality of equally spaced scanning lines N which extend approximately in parallel with the X-axis 206, in order to generate an image signal. The image signal thus generated contains a signal having a pulse width longer than that of a detection signal of each of the first and second patterns 204 and 205, so that it cannot be used in its original form. The image signal is thus introduced into a wave-shaping circuit 105 which comprises, as shown in FIG. 4, a series connection of a first differentiating circuit 301, a Schmitt circuit 302, an inverter 303, a second differentiating circuit 304 and a monostable multivibrator 305. As shown in FIG. *5a*, when the first pattern 204 is scanned along a ($n1$) th scanning line to produce an image signal, the signal is differentiated by the first differentiating circuit 301 in the wave-shaping circuit 105 to obtain a signal as shown in FIG. *5b*, whose rising component in turn is shaped into a pulse as shown in FIG. *5c*. Since the widths of the pulse are not constant, the pulse from the Schmitt circuit is inverted by the inverter 303 as shown in FIG. *5d* and differentiated by the second differentiating circuit 304 as shown in detected pulse *5e*, and shaped into a six-pulse signal having a constant pulse width as shown in FIG. *5f* by triggering the monostable multivibrator 305 with a negative pulse. By passing the image signal through the wave-shaping circuit 105, a signal component having a longer pulse width and a DC component can be deleted from the image signal. The signal obtained from the first pattern is detected by being discriminated from the other signal by delay circuits 106*b*, 106*c*, 106*d*, 106*e* and 106*f* and an AND circuit 107. Namely, the detected pulse signal of the first pattern consists of six pulses as shown in FIG. 6*a*. If the pulse interval is denoted by $\tau 1$, the time lag between the *m*th pulse and the sixth pulse is $(6-m)1$. In order that the six pulses may be generated simultaneously, five of them are introduced into the delay circuits 106*b* to 106*f* respectively and each delayed by $\tau 1$ by the delay circuit 106*b*, $2\tau 1$ by the delay circuit 106*c*, $3\tau 1$ by the delay circuit 106*d*, $4\tau 1$ by the delay circuit 106*e* and by $5\tau 1$ by the delay circuit 106*f*, as shown in FIGS. 6*b* to 6*f*. These delayed signals are introduced into the AND circuit 107 together with the nondelayed signal, and an output signal from the AND circuit 107 is taken out as a position detecting signal when the sixth pulse of the nondelayed signal is introduced into the AND circuit 107. The sixth pulse of the detected signals may be delayed by 1 through an additional delay circuit (not shown). In this case, there must be delayed in each delay circuit 106*b*, 106*c*, 106*d*, 106*e* and 106*f*, each pulse by $2\tau 1$, $3\tau 1$, $4\tau 1$, $5\tau 1$.

Figure 7A:
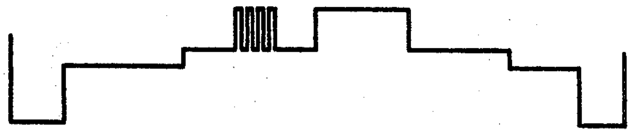
Figure 7B:
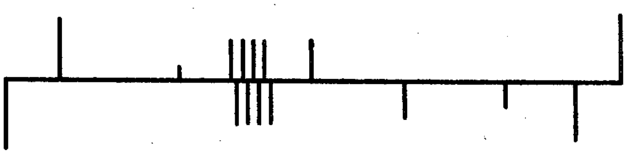
Figure 7C:
Figure 7D:
Figure 7E:
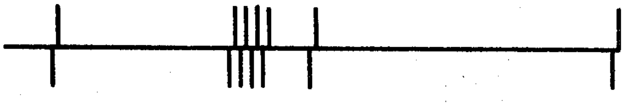
Figure 7F:
Figures 8A, 8B, 8C, 8D:
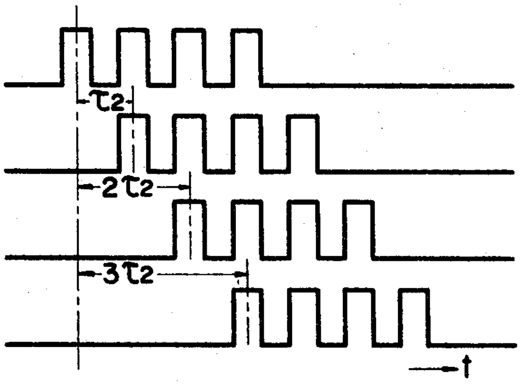

The second pattern 205 is scanned with a ($n2$) th scanning line to produce an image signal as shown in FIG. 7*a*. The signal is shaped by a wave-shaping circuit 105 in a manner similar to that described in connection with the treatment of the image signal of the first pattern, as shown in FIGS. 7*a* to 7*f*, whereby four pulse signals are obtained. As shown in FIG. 8*a*, if the pulse interval of the signals is denoted by $\tau 2$, there is a time lag of $(4-m)\tau 2$ between the *m*th pulse and the fourth pulse. In order that the four pulses may be detected at the same time, three of them are fed to delay circuits 108*b*, 108*c*, 108*d* and each delayed by $\tau 2$ by the delay circuit 108*b*, $2\tau 2$ by the delay circuit 108*c* and by $3\tau 2$ by the delay circuit 108*d* as depicted in FIGS. 8*b* to 8*d* inclusive. The delayed signals are supplied to an AND circuit 109 together with the nondelayed signal and an output from the AND circuit 109 is taken out as a direction-detecting signal as soon as the fourth pulse of the nondelayed signal is supplied to the AND circuit 109.

The AND circuit 107 is fed with pulse signals other than those of the first pattern. The circuit 107, however, does not operate in response to the detecting signals of the second pattern 205 and the electrode pattern 203, since the output signal from the AND circuit 107 is derived only at a time common to the six inputs. Similarly, the output signal from the AND circuit 109 is taken out only at a time common to the four inputs. Since the detecting pulses of the second pattern differ in number and width from those of the first pattern or of the electrode pattern, the AND circuit 109 is not operative in response to the detecting signals of the first pattern and the electrode pattern. Thus, the AND circuits 107 and 109 respectively function only in response to the detecting signal of the first pattern and the detecting signal of the second pattern, each signal having a predetermined pulse width and pulse interval. The optical image within the visual field is scanned along scanning lines in number of N which extend from one end 208 of the visual field to the other end 209 in equally spaced parallel relationship with each other. By denoting a scanning period per scanning line as T, an XY coordinate system is established in the visual field of the optical system in such a manner that the origin thereof lies on a point on a (N/2) th scanning line at the time T/2. The value of each of the first and second patterns is calculated on the Y-coordinate according to which scanning line has scanned the patterns. A counter 111 for counting the number of the required scanning lines is adapted to set the value of the Y-coordinate of the first pattern, while a counter 112 for counting the number of the required scanning lines reads the Y-coordinate of the second pattern. The counters 111 and 112 open their gates when a scanning point is at the end of the visual field 201 or a frame scan start point 208, in response to a scan start signal transmitted from the television camera 103, and start counting the number of the required scanning lines. The counter 111 shuts its gate and stops counting in response to the position detecting signal derived from the AND circuit 107 after scanning of the first pattern along ($n1$) th scanning line. Now, a numerical value representing the ($n1$) th line indicated by the counter 111 is assumed to be A. A signal representing the numerical value A and an output signal from a producer 113 for producing a value V of the origin of the Y-axis established on a point on the (N/2) th scanning line or for producing the value of establishing the Y-axis are introduced into a substracting counter 114 where the difference between these signals is calculated to produce a coordinate signal V−A. The producer 113 has, when a number of one figure is to be represented, such an arrangement that a source of DC voltage 310 is connected via changeover switches 315, 316, 317 and 318 with four terminals 311, 312, 313 and 314 representing respectively the figures $2^0$, $2^1$, $2^2$ and $2^3$, as shown in FIG. 9. Depending upon the intensity of the signal V−A, the position of the first pattern to be detected is:

if $V-A>0$, on the negative Y-coordinate;
if $V-A=0$, on the X-axis; and
if $V-A<0$, on the positive Y-coordinate.

Thus, a Y-coordinate signal $V-A=H$ of the first pattern is derived from an output terminal 115. Similarly, the counter 112 closes its gate and stops counting in response to the direction detecting signal derived from the AND circuit 109 after scanning of the second pattern along a ($n2$) th scanning line. Assuming now that a numerical value representing the ($n2$) th scanning line indicated by the counter 112 is B, a signal representing the value B is supplied to a substracting counter 116 together with the signal A above mentioned, thereby to calculate the difference between the signals to obtain a coordinate signal A−B. Depending upon the intensity of the coordinate signal, it is clear that the position of the second pattern in respect of the Y-coordinate is:

if $A-B<0$, on a point having a value higher than that of A;
if $A-B=0$, on the same Y-coordinate as A; and
if $A-B>0$, on a point having a value lower than that of A.

From the substracting counter 116 is thus detected the difference $A-B=I$ between the values on the Y-coordinate of the first and second patterns, whereby a shift in the value on the Y-coordinate of the second pattern against that of the first pattern can be detected.

The values on the X-coordinate of the first and second patterns can be obtained as follows. As shown in FIG. 10, hour meters 117 and 118 each comprise a gate 320 and a counter 321, said gate being adapted to be supplied with an output from a timing signal generator 319, a synchronizing signal for X-axis scanning which is transmitted from the television camera, and the X-coordinate detecting signal of the pattern. The hour meter 117 is for calculating the time interval between the X-coordinate detecting signal of the first pattern and the synchronizing signal for X-axis scanning. This time interval is calculated in terms of imaginary X-axis scanning lines corresponding in number to the required scanning lines along the Y-coordinate. It is denoted that the ratio of the X-Y axes within the visual field 201 is 1:1 and that the time and the number of scanning lines which are required for X-axis scanning are T and N, respectively, similarly as those given in Y-axis scanning. A scanning period per line is then T/N and a reference period of the timing signal to be generated by the timing signal generator 119 is adjusted to I/N. When the gate 120 is opened by the synchronizing signal for X-axis scanning, the timing signal having the reference period T/N is passed through the gate and counted by the counter 121. The operation of the counter 121 is stopped when the gate 120 responsive to the position detecting signal of the first pattern is closed, said position detecting signal being obtained from the AND circuit 107 at a point of a ($n3$) th imaginary scanning line intersecting with a ($n1$) th scanning line during scanning of the first pattern. A numerical value indicated by the counter 121 thus represents the number of reference periods, in other words, the number of imaginary scanning lines $n3$ required for X-axis scanning. A signal representing the number of the required imaginary scanning lines $n3$ indicates an X-coordinate signal C of the first pattern. Similarly as in the Y-axis, the origin of the X-axis is set at a point N/2=V with the number of imaginary scanning lines N. The X-coordinate signal derived from the hour meter 117 and the output signal V of the producer 113 above described are supplied to a subtracting counter 119, where the difference between the signals is calculated thereby to generate an X-coordinate signal V-C. The position of the first pattern measured along the X-coordinate is:

if V—C>0, on the negative D-coordinate;

if V—C=0, on the Y-axis; and if V—C<0, on the positive X-coordinate.

Accordingly, the X-coordinate signal V—C=J of the first pattern is derived from an output terminal 120.

Similarly, the direction detecting signal derived from the AND circuit 109 after scanning of the second pattern at an intersecting point of a ($n2$) th scanning line and a ($n4$) th imaginary scanning line causes the gate of the hour meter 118 to be closed and causes the hour meter 118 to measure the time interval between the synchronizing signal for X-axis scanning and the detecting signal of the second pattern thereby to obtain an X-coordinate signal D calculated in terms of the number of imaginary scanning lines $n4$. The X-coordinate signal D is introduced into a subtracting counter 121 together with said X-coordinate signal C, whereby the difference C—D=K is calculated and hence the difference between the values of the first and second patterns on the X-coordinate is measured. The signal C—D=K thus generated permits the detection of a shift of the second pattern against the first pattern in respect of the X-coordinate. It is thus appreciated that the position of the second pattern in respect of the X-coordinate is:

if C—D>0, on a point having a value lower than that of C;

if C—D=0, on the same X-coordinate as C; and if C—D<0, on a point having a value higher than that of C.

The subtracting counter 121 thus detects a shift C—D=K of the pellet 101 on the X-axis as viewed through the visual field of the optical system. The signals K and I obtained from the subtracting counters 121 and 116 and which respectively represent the shifts of the pellet 101 in the directions of the XY axes are introduced into an angle detector 122 to obtain from its output terminal 123 the value of inclination $\theta=\tan^{-1}$ I/K of the pellet on the coordinate system. Said value of inclination determines the direction in which the pellet lies.

As has been stated, the X-coordinate signal J, the Y-coordinate signal H, both representing the position of the first pattern and hence the pellet, and the signal representing the inclination $\theta$ or the direction of the pellet are respectively derived from the output terminals 120, 115 and 123. The position of the electrode formed on the pellet can be detected as a result of detecting the position and direction of the pellet.

The foregoing embodiment has been directed to the detection of both the position and direction of an object of extremely small size. When the direction of the object is fixed, it is possible in accordance with this invention to form on a predetermined portion of the surface of the object a position pattern of the shape as shown in FIGS. *2b* and *2o*, namely, cross stripes, vertical stripes, a partly broken ring or the like, other than multiple rings as shown in FIG. *2a*, and cause such a pattern, when scanned, to produce a predetermined number of pulse signals having a predetermined pulse width and interval. The detection of only the position of this pattern can be achieved with that part of the arrangement of FIG. 1 which effects the detection of the first pattern. For the sake of brevity, this part is extracted and shown in FIG. 11. Parts corresponding to those in FIG. 1 are designated by the same reference numerals. The Y-coordinate of the first pattern is detected by the counter 111 and the X-coordinate is measured by the hour meter 117. The position of the first pattern is detected by the subtracting counters 114 and 119.

Although a counter and an hour meter have been described to measure, respectively, a value on the Y-coordinate and that on the X-coordinate, they may be interchanged by properly determining the direction of scanning, so that a value on the Y-coordinate may be measured by the hour meter and that on the X-coordinate by the counter. Further, it will be readily understood from the fact that an hour meter includes a counter as a major component that both the coordinates may be measured by counters or by hour meters alone. Also, the invention has been explained in respect of electrical scanning using an image pickup tube, but mechanical scanning can be employed as will be obvious to those skilled in the art. Scanning can also be made both mechanically and electrically by suitably selecting a source of illumination. It is also possible to relatively move the object instead of moving a scanning beam to attain an equal scanning effect.

This invention is also applicable to control of a semiconductor needle element or automatic mounting of a pellet on a stem as in automatic bonding or automatic property selection or the like of semiconductor material.

Various examples of the pattern as shown in FIGS. *2b* to *2o* can be used for detecting the direction of an object or a pellet when the direction of the pellet is not fixed, but is within a limited range. In this case, different patterns must be selected for the first and second patterns.

What is claimed is:

1. A position-detecting system comprising means for scanning an image of a fine object having a position pattern formed thereon at a predetermined portion to generate an image signal having a pattern signal component consisting of pulses of a predetermined width, interval and number, means for shaping said pattern signal component into a detection signal having pulses of a predetermined width, interval and number to represent said position pattern, and means for calculating the position of said position pattern relative to a predetermined fixed point on the basis of the detection signal by counting a combination of the number or time of scanning line required from the start of scanning to the detection of pattern signal and the time required from the start of scanning line to the detection of pattern signal so as to detect the position of said fine object.

2. In a position-detecting system comprising means for scanning an image of a fine object having a position pattern formed thereon at a predetermined portion to generate an image signal having a pattern signal component consisting of pulses of a predetermined width, interval and number, means for shaping said pattern signal component into a detection signal having pulses of a predetermined width, interval and number to represent said position pattern, and means for calculating the position of said position pattern relative to a predetermined fixed point on the basis of the detection signal so as to detect the position of said fine object the improvement therein wherein said scanning means is a television camera, said shaping means comprises a wave-shaping circuit including a first differentiating circuit for differentiating said pattern signal, said system further including a Schmitt circuit for forming a rising component of an output of said first differentiating circuit into pulses, an inverter for inverting an output from said Schmitt circuit, a second differentiating circuit for differentiating an output from said inverter to generate a negative output pulse, and a monostable multivibrator to generate a basic train of pulses triggered and shaped by said negative output pulse, and said calculating means comprises delay circuits whose number is less than, by one, that of pulses obtained from said position-detecting pattern and which delay for respectively predetermined periods of time pulse trains obtained by shunting said basic pulse train so that each one of pulses of said trains may be generated concurrently with a pulse of said basic train, an AND circuit operative only when an output pulse from each of said delay circuits is derived simultaneously with a pulse of the basic pulse train, means for fixing the value of establishment of a coordinate axis, a Y-coordinate detecting means including a counter for counting the number of scanning lines in the direction of a Y-axis during the period of start of scanning and detection of the pattern and which is connected to the television camera and the AND circuit, and a first subtracting counter for calculating the difference between an output from said means for fixing the value of establishment of a coordinate axis and an output from said counter for counting the number of scanning lines in the direction of a Y-axis, and an X-coordinate detecting means comprising an hour meter connected to the television camera and said AND circuit and adapted to calculate a period between start of scanning and detection of the pattern in the direction of an X-axis and a second subtracting counter for calculating the difference between an output from said means for fixing the value of establishment of a coordinate axis and an output from said X-axis hour meter.

3. A position and direction detecting system comprising means for obtaining an image signal by scanning a fine object having a first pattern and a second pattern thereon at predetermined portions thereof, said first pattern having such a shape that an image signal obtained by scanning said first pattern has pulses of a predetermined width, interval and number, said second pattern having a shape differring from that of the first pattern, means for obtaining from said image signal obtained by said means a first detecting signal and a second detecting signal both wave shaped to have pulses corresponding in pulse width, interval and in number to said first pattern and said second pattern respectively, means for calculating the position of said first pattern relative to a predetermined fixed point on the basis of said first detecting signal and for detecting the position of said fine object by detecting the coordinate of said first pattern, and means for calculating the position of said second pattern relative to a predetermined fixed point on the basis of said second detecting signal and for detecting the direction of said fine object on the basis of the difference between the coordinate value of said first pattern and the coordinate value of said second pattern.

4. The system according to claim 3 wherein said means for obtaining the image signal is a television camera, said means for obtaining the detecting signals comprises a first differentiating circuit for differentiating said image signal, a Schmitt circuit for forming a rising component of an output from said first differentiating circuit into pulses, an inverter for inverting an output from said Schmitt circuit, a second differentiating circuit for differentiating an output from said inverter, and a monostable multivibrator to generate a basic train of pulses triggered by a negative output pulse from said second differentiating circuit, said means for calculating the position of the object comprises a first group of delay circuits whose number is less than, by one, that of pulses obtained from said first pattern and which cause pulse trains obtained by shunting said basic pulse train to be delayed for respectively predetermined periods of time so that each one of pulses of said trains may be generated concurrently with a pulse of said basic train, a first AND circuit operative only when an output pulse from each of said first group of delay circuits is derived concurrently with a pulse of said basic pulse train, a fixed value producer for a coordinate axis, a Y-coordinate detecting means for the first pattern comprising a first counter connected to the television camera and the first AND circuit and which counts the number of Y-axis scanning lines during the period of start of scanning and detection of the first pattern, and a first subtracting counter for calculating the difference between an output from said fixed value producer and an output from said first counter, and said means for detecting the direction of the fine object comprises a second group of delay circuits whose number is less than, by one, that of pulses obtained from said second pattern and which cause pulse trains obtained by shunting said basic pulse train to be delayed for respectively predetermined periods of time so that each one of pulses of said trains may be generated concurrently with a pulse of said basic train, a second AND circuit operative only when an output pulse from each of said second group of delay circuits is derived concurrently with a pulse of said basic pulse train means for calculating the difference between the Y-coordinate values of said first pattern and said second pattern comprising a second counter connected to the television camera and said second AND circuit and which counts the number of Y-axis scanning lines during the period of start of scanning and detection of the second pattern thereby to calculate a Y-coordinate value of the second pattern, and a third subtracting counter for calculating the difference between an output from said first counter and an output from said second counter, means for calculating the difference between the X-coordinate values of said first pattern and said second pattern comprising a second hour meter counter connected to the television camera and the second AND circuit and which calculates the X-axis scanning period between start of scanning and detection of the second pattern, thereby to detecting the X-coordinate value of the second pattern, a fourth subtracting counter for calculating the difference between an output from said first hour meter counter and said second hour meter counter, and means for calculating the inclination within a coordinate plane of a line interconnecting the first pattern and the second pattern on the basis of signals representing respectively the difference between the Y-coordinate values of the first and second patterns and the difference between the X-coordinate values of the first and second patterns.